United States Patent
Ozbutun (10) Patent No.: US 7,676,453 B2
(45) Date of Patent: Mar. 9, 2010

(54) PARTIAL QUERY CACHING

(75) Inventor: Cetin Ozbutun, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 437 days.

(21) Appl. No.: 10/830,510

(22) Filed: Apr. 22, 2004

(65) Prior Publication Data

US 2005/0240570 A1 Oct. 27, 2005

(51) Int. Cl.
G06F 7/00 (2006.01)
G06F 17/30 (2006.01)

(52) U.S. Cl. .................. 707/3; 707/1; 707/2; 707/4; 707/6

(58) Field of Classification Search .............. 707/3
See application file for complete search history.

(56) References Cited

U.S. PATENT DOCUMENTS

| | | | |
|---|---|---|---|
| 4,991,087 A * | 2/1991 | Burkowski et al. ............. | 707/3 |
| 5,133,075 A | 7/1992 | Risch | |
| 5,241,305 A | 8/1993 | Fascenda et al. | |
| 5,265,221 A | 11/1993 | Miller | |
| 5,276,901 A | 1/1994 | Howell et al. | |
| 5,412,804 A | 5/1995 | Krishna | |
| 5,428,778 A | 6/1995 | Brookes | |
| 5,495,608 A | 2/1996 | Antonshenkov | |
| 5,499,368 A | 3/1996 | Tate et al. | |
| 5,706,435 A * | 1/1998 | Barbara et al. ............. | 711/141 |
| 5,748,899 A | 5/1998 | Aldrich | |
| 5,751,949 A | 5/1998 | Thomson et al. | |
| 5,761,654 A | 6/1998 | Tow | |
| 5,765,154 A | 6/1998 | Horikiri et al. | |
| 5,787,428 A | 7/1998 | Hart | |
| 5,802,523 A | 9/1998 | Jasuja et al. | |
| 5,815,574 A | 9/1998 | Fortinsky | |
| 5,819,256 A | 10/1998 | Ozbutun et al. | |
| 5,822,748 A | 10/1998 | Cohen et al. | |
| 5,842,220 A | 11/1998 | De Groot et al. | |

(Continued)

FOREIGN PATENT DOCUMENTS

EP  1 089 194 A2  4/2001

(Continued)

OTHER PUBLICATIONS

"Signature Matching: A Key to Reuse", by Zaremski et al, May 3, 1993, Carnegie Mellon University.*

(Continued)

Primary Examiner—Tim T. Vo
Assistant Examiner—Jay A Morrison
(74) Attorney, Agent, or Firm—Hickman Palermo Truong & Becker LLP (57) ABSTRACT

When a query is performed an execution plan is formed, which is made up of a plurality of plan operators. Before executing any given plan operator, a storage area is checked. If a results set has been stored corresponding to the plan operator, then the cached results set is used instead of the executing the plan operator. If no results set exists that corresponds to the particular plan operator, the plan operator is executed, and the results set that is output may be stored for use by another plan operator of another execution plan.

28 Claims, 4 Drawing Sheets

U.S. PATENT DOCUMENTS

| | | | |
|---|---|---|---|
| 5,848,408 | A | 12/1998 | Jakobsson et al. |
| 5,857,180 | A | 1/1999 | Hallmark et al. |
| 5,870,743 | A | 2/1999 | Cohen et al. |
| 5,875,445 | A | 2/1999 | Antonshenkov |
| 5,884,307 | A | 3/1999 | Depledge et al. |
| 5,899,988 | A | 5/1999 | Depledge et al. |
| 5,903,888 | A | 5/1999 | Cohen et al. |
| 5,903,898 | A | 5/1999 | Cohen et al. |
| 5,907,297 | A | 5/1999 | Cohen et al. |
| 5,924,088 | A | 7/1999 | Jakobsson et al. |
| 5,937,409 | A | 8/1999 | Wetherbee |
| 5,956,704 | A | 9/1999 | Gautam et al. |
| 5,963,932 | A | 10/1999 | Jakobsson et al. |
| 5,963,935 | A | 10/1999 | Ozbutun et al. |
| 5,974,408 | A | 10/1999 | Cohen et al. |
| 5,991,754 | A | 11/1999 | Raitto et al. |
| 5,999,946 | A | 12/1999 | Bailis et al. |
| 6,026,391 | A | 2/2000 | Osborn et al. |
| 6,067,540 | A | 5/2000 | Ozbutun et al. |
| 6,081,800 | A | 6/2000 | Ozbutun et al. |
| 6,134,559 | A | 10/2000 | Brumme et al. |
| 6,138,120 | A | 10/2000 | Gongwer et al. |
| 6,141,656 | A | 10/2000 | Ozbutun et al. |
| 6,144,957 | A | 11/2000 | Cohen et al. |
| 6,163,858 | A | 12/2000 | Bodamer |
| 6,167,517 | A | 12/2000 | Gilchrist et al. |
| 6,182,277 | B1 | 1/2001 | DeGroot et al. |
| 6,195,656 | B1 | 2/2001 | Ozbutun et al. |
| 6,205,442 | B1 | 3/2001 | Cohen et al. |
| 6,212,578 | B1 | 4/2001 | Racicot et al. |
| 6,219,666 | B1 | 4/2001 | Krishnaswamy et al. |
| 6,266,662 | B1 | 7/2001 | Ozbutun et al. |
| 6,275,830 | B1 | 8/2001 | Muthukkaruppan et al. |
| 6,304,974 | B1 | 10/2001 | Samar |
| 6,314,419 | B1 | 11/2001 | Faisal |
| 6,321,238 | B1 | 11/2001 | Putzolu |
| 6,332,198 | B1 | 12/2001 | Simons et al. |
| 6,341,281 | B1 * | 1/2002 | MacNicol et al. ............... 707/3 |
| 6,341,340 | B1 | 1/2002 | Tsukerman et al. |
| 6,347,314 | B1 * | 2/2002 | Chidlovskii .................... 707/3 |
| 6,351,742 | B1 | 2/2002 | Agarwal et al. |
| 6,370,522 | B1 | 4/2002 | Agarwal et al. |
| 6,401,083 | B1 | 6/2002 | Agarwal et al. |
| 6,418,430 | B1 | 7/2002 | DeFazio et al. |
| 6,421,666 | B1 | 7/2002 | Murthy et al. |
| 6,430,550 | B1 | 8/2002 | Leo et al. |
| 6,457,020 | B1 * | 9/2002 | Carey et al. ............. 707/103 R |
| 6,466,931 | B1 | 10/2002 | Attaluri et al. |
| 6,477,525 | B1 | 11/2002 | Bello et al. |
| 6,484,179 | B1 | 11/2002 | Roccaforte |
| 6,487,552 | B1 | 11/2002 | Lei et al. |
| 6,487,641 | B1 | 11/2002 | Cusson et al. |
| 6,493,710 | B1 | 12/2002 | Gollapudi et al. |
| 6,496,819 | B1 | 12/2002 | Bello et al. |
| 6,510,504 | B2 | 1/2003 | Satyanarayanan |
| 6,529,885 | B1 | 3/2003 | Johnson |
| 6,546,382 | B1 | 4/2003 | Amor et al. |
| 6,546,394 | B1 | 4/2003 | Chong et al. |
| 6,549,916 | B1 | 4/2003 | Sedlar |
| 6,578,037 | B1 | 6/2003 | Wing et al. |
| 6,581,055 | B1 | 6/2003 | Ziauddin et al. |
| 6,601,071 | B1 | 7/2003 | Bowker et al. |
| 6,609,131 | B1 | 8/2003 | Zait et al. |
| 6,615,206 | B1 | 9/2003 | Jakobsson et al. |
| 6,622,138 | B1 | 9/2003 | Bellamkonda et al. |
| 6,631,371 | B1 | 10/2003 | Lei et al. |
| 6,636,870 | B2 | 10/2003 | Roccaforte |
| 6,658,405 | B1 | 12/2003 | Ozbutun |
| 6,665,684 | B2 | 12/2003 | Zait et al. |
| 6,671,715 | B1 | 12/2003 | Langseth et al. |
| 6,684,203 | B1 | 1/2004 | Waddington et al. |
| 6,684,207 | B1 | 1/2004 | Greenfield et al. |
| 6,691,099 | B1 | 2/2004 | Mozes |
| 6,691,118 | B1 | 2/2004 | Gongwer et al. |
| 6,694,306 | B1 * | 2/2004 | Nishizawa et al. ............. 707/3 |
| 6,708,185 | B2 | 3/2004 | Harris |
| 6,711,571 | B2 | 3/2004 | Putzolu et al. |
| 6,732,085 | B1 | 5/2004 | Mozes |
| 6,738,762 | B1 * | 5/2004 | Chen et al. ..................... 707/3 |
| 6,738,782 | B2 | 5/2004 | Agarwal et al. |
| 6,741,997 | B1 | 5/2004 | Liu et al. |
| 6,986,060 | B1 | 1/2006 | Wong |
| 7,035,846 | B2 * | 4/2006 | Gupta et al. ................... 707/3 |
| 7,158,966 | B2 * | 1/2007 | Brill et al. ...................... 707/3 |
| 7,194,451 | B2 * | 3/2007 | Chaudhuri et al. ............. 707/2 |
| 2002/0001307 | A1 | 1/2002 | Nguyen et al. |
| 2002/0038300 | A1 | 3/2002 | Iwata et al. |
| 2002/0059203 | A1 | 5/2002 | Witkowski et al. |
| 2002/0095405 | A1 | 7/2002 | Fujiwara |
| 2002/0116457 | A1 * | 8/2002 | Eshleman et al. ........... 709/203 |
| 2003/0055832 | A1 | 3/2003 | Roccaforte |
| 2003/0208503 | A1 | 11/2003 | Roccaforte |
| 2003/0212694 | A1 | 11/2003 | Potapov et al. |
| 2003/0236780 | A1 | 12/2003 | Saha et al. |
| 2003/0236781 | A1 | 12/2003 | Lei et al. |
| 2003/0236782 | A1 | 12/2003 | Wong et al. |
| 2004/0064441 | A1 | 4/2004 | Tow |
| 2004/0098413 | A1 | 5/2004 | Peng |
| 2004/0111375 | A1 | 6/2004 | Johnson |
| 2004/0139043 | A1 | 7/2004 | Lei et al. |
| 2005/0203878 | A1 * | 9/2005 | Brill et al. ...................... 707/3 |

FOREIGN PATENT DOCUMENTS

WO     WO 03/038669 A1     5/2003

OTHER PUBLICATIONS

Oracle Corporation, "Key Considerations," Oracle9iAS Containers for J2EE Support for JavaServer Pages Reference, Release 2 (9.0.2), Part No. A95882-01, 2000, 2002, http://download-west.oracle.com/docs/cd/A97329_01/web.902/a95882/keydev.htm#10215, data retrieved Jun. 24, 2004, pp. 1-22.

Oracle Corporation, "Basic Programming Considerations," Oracle Application Server Containers for J2EE Support for JavaServer Pages Developer's Guide, 10g (9.0.4), Part No. B10320-01, 2000, 2003, http://download-west.oracle.com/docs/cd/B10464_01/web.904/b10320/basics.htm#1009139, data retrieved Jun 24, 2004, pp. 1-20.

Oracle Corporation, "Key Considerations," Oracle9i Support for JavaServer Pages Reference, Release 2 (9.2), Part No. A96657-01, 2000, 2002, http://download-west.oracle.com/docs/cd/B10501_01/java.920/a96657/keydev.htm#10171, data retrieved Jun. 24, 2004, pp. 1-20.

Oracle Corporation, "Sample Illustrating Statement Caching Support in Oracle9i JDBC Drivers," 2004, http://otn.oracle.com/sample_code/tech/java/sqlj_jdbc/files/jdbc30/StmtCacheSample/Readme.html?_template=/otn/content/print, data retrieved Jun. 24, 2004, pp. 1-7.

MySQL, "MySQL Manual, 5.10 the MySQL Query Cache," http://dev.mysql.com/doc/mysql/en/Query_Cache.html, data retrieved Jun. 24, 2004, pp. 1-3 and 129-133.

Oracle Corporation, "JINT Demo: Accelerate Performance with Oracle9iAS Web Cache," 2004, http://otn.oracle.com/sample_code/tech/java/j2ee/jintdemo/tutorials/webcache.html?_temp, data retrieved Jun. 24, 2004, pp. 1-6.

Xiang Liu, Oracle Corp., "Developing High Performance Applications with Oracle9iAS Web Cache and ESI," Paper 28426, pp. 1-15.

Jesse Anton, et al., "Web Caching for Database Applications with Oracle Web Cache," ACM SIGMOD 2002, Jun. 4-6, 2002, Madison, Wisconsin, 6 pages.

Oracle Corporation, "Oracle 8i, Concepts," Release 2 (8.1.6), Dec. 1999, Part No. A76965-01, pp. x-xxv, 22-1-22-11 and 24-1-24-39.

International Searching Authority, "Notification of Transmittal of the International Search Report and the Written Opinion of the International Searching Authority, or the Declaration," PCT/US2005/013648, mailing date Aug. 30, 2005, 13 pages.
Current Claims, PCT/US2005/013648, 4 pages.
Gupta, Amit et al., "Query Scheduling in Multi Query Optimization," Database Engineering & Applications, 2001, International Symposium on Jul. 16-18, 2001, XP-010554363, pp. 11-19.
Malladi, Rajeswari et al., "Applying Multiple Query Optimization in Mobile Databases," System Sciences 2003, Proceedings of the 36th Annual Hawaii International Conference 2003, XP-010636732, pp. 294-303.
Park, Jooseok, et al., "Using Common Subexpressions to Optimize Multiple Queries," Data Engineering 1988, Proceedings of the International Conference, Los Angeles CA., 1988, XP-010011428, pp. 311-319.
El Zanfaly, Doan S. et al., "Multi Level Caching to Speedup Query Processing in Distributed Databases," Signal Processing and Information Technology, 2003, Proceeding of the 3rd IEEE International Symposium, Darmstadt, Germany 2003, XP-010729221, pp. 580-583.
International Preliminary Examining Authority, "Written Opinion", PCT/US2003/041541, mailing date Sep. 01, 2005, 6 pages.
Current Claims, PCT/US2003/041541, 3 pages.
Motro, Amihai, "An Access Authorization Model for Relational Databases Based on Algebraic Manipulation of View Definitions," Data Engineering, 1989, XP010015183.
Michael Stonebraker et al., "Access Control in a Relational Data Base Management System by Query Modification," ACM/CSC-ER, 1974, XP-002319462, pp. 180-186.
T.F. Keefe et al., "Secure Query-Processing Strategies," IEEE, No. 3, Mar. 1989, XP 000122365, pp. 63-70.
International Search Authority, "Notification of Transmittal of the International Search Report and the Written Opinion of the International Searching Authority, or the Declaration," International Application No. PCT/US2004/043480, Apr. 22, 2005, 12 pages.
Current Claims Of International Application No. PCT/US2004/043480, pp. 1-6.
International Searching Authority, "Written Opinion of the International Preliminary Examining Authority," PCT/US2005/013648, dated Apr. 27, 2006, 7 pages.
Current Claims, PCT/US2005/013648, 4 pages.
European Patent Office Communication Pursuant to Article 96(2) EPC, dated Apr. 19, 2007, 4 pages.
PCT International Preliminary Report on Patentability, dated Sep. 26, 2006, 9 pages.
Amit Gupta, et al., "Query Scheduling in Multi Query Optimization", Jul. 16, 2001, pp. 11-19.
Doaa S. El Zanfaly, et al., "Multilevel Caching to Speedup Query Processing in Distributed Databases", Dec. 14, 2003, pp. 580-583.
Keller et al, "A predicate-based caching scheme for client-server database architectures", The VLDB Journal (1996) 5: 35-47, Springer-Verlag, 13 pages.
Scheurermann et al, "Watchman: "A Data Warehouse Intelligent Cache Manager, Proceedings of the $22^{nd}$ VLDB Conference Mumbai (Bombay), India 1996, 12 pages.
Kotidis et al, "DynaMat: A Dynamic View Management System for Data Warehouses", ACM, ACM SIGMOD Record, vol. 28, Issue 2, ISSN: 0163-5808, Jun. 1999, 12 pages.

* cited by examiner

PARTIAL QUERY CACHING

FIELD OF THE INVENTION

The present invention relates to processing database commands, and in particular to caching results sets of queries.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, the problems identified with an approach should not be assumed to have been recognized in the prior art, unless otherwise indicated.

When a database server receives a statement representing a request to perform a database operation, the database server may generate an execution plan. An execution plan defines the steps and operations performed by a database server to carry out a request. The statement used to request database operations may be in the form of a database command that conforms to a database language, such as Structured Query Language (SQL).

It is desirable to return results sets of queries quickly. As more and more people use databases to get information they are looking for, there is increased likelihood that some of the queries issued against a database are the same. In some systems, results sets of at least certain queries are stored. When a query is received a text based search is performed to find the previously executed query. If it is found that the same identical query (having the same text) is being presented for a second time, and if the results set for that query was stored, the system returns the cached results set rather than performing the query a second time. The more people that use the database, the greater the performance enhancement gained by saving the results sets of queries.

However, many queries are not identical, but similar. Many queries may process subsets of identical data within their results sets. Nonetheless, because the queries are not identical, a cached results set that is likely to have identical subsets of data as the expected results set cannot be reused, despite the similarity of the results sets, and each of the similar queries are executed.

Based on the forgoing, there is still a need to store and reuse results sets of queries.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for partial query caching is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Described herein are approaches that use at least a portion of the results previously generated for a query for a subsequent computation of another query. A results set generated for an operation defined by the execution plan of a query is used as the results set for an identical or similar operation of an execution of another query.

Execution Plans

Database servers generate execution plans that are optimized for efficiency. When determining what steps to include in an execution plan, and the order in which the steps are performed, a database server accounts for many factors that affect efficiency. For example, a query may request rows that contain a first value in a first column and a second value in a second column. If the first column is indexed, then a database server may generate an execution plan that uses the index to access data more efficiently. Such an execution plan may include the following steps, executed in the order indicated below.

1. Access the index and generate row IDs of rows that contain the first value in the first column.
2. Obtain the set of rows identified by the row IDs.
3. Filter the set of rows for the second value in the second column.

A query execution plan comprises steps referred to as "plan operators". A plan operator defines a set of operations that are performed in an execution plan and that may be executed by a database server to access one or more row sources. A row source may be data stored in a database (e.g., one or more rows in a table), or one or more output rows of another plan operator. Execution plans are explained in chapter 22-24 of *Oracle 8i Concepts*, by Oracle Corporation, February, 1999. The contents of *Oracle 8i Concepts* are incorporated herein by reference.

Illustrative Execution Plan Diagram

Figure 1:
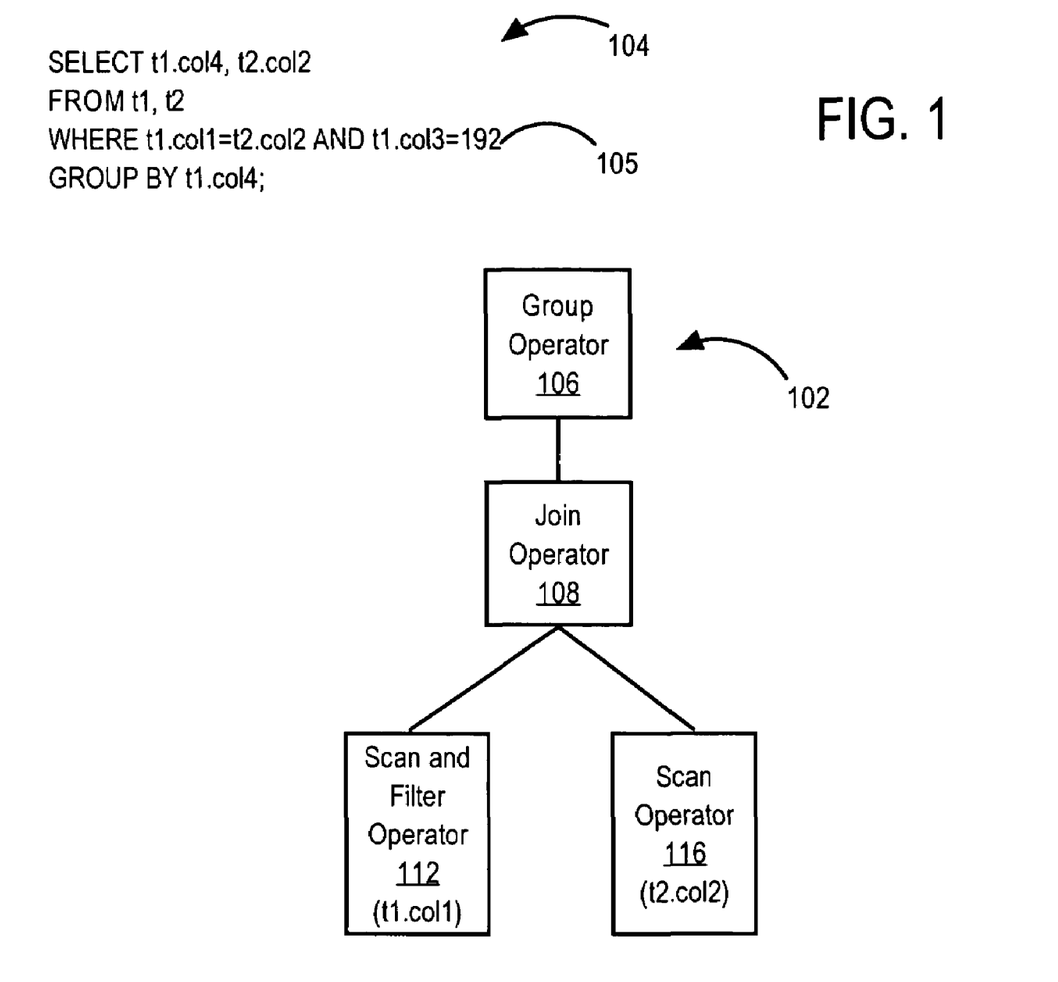
FIG. 1 is an execution plan diagram.

An execution plan can be represented by an execution plan diagram. FIG. 1 is an execution plan diagram provided to illustrate various features of an example of an execution plan that includes partial query caching. In FIG. 1, execution plan 102 is generated for query 104 (by the database server). Query 104 is the query SELECT t1.col4, t2.col2
FROM t1, t2
WHERE t1.col1=t2.col2 AND t1.col3=192
GROUP BY t1.col4;

Query 104 contains predicate 105, which is t1.col1=t2.col2 and t1.col3=192. A predicate is a logical expression that defines criteria that must be satisfied by the rows in the tables against which a query is applied.

In execution plan 102, plan operators are depicted using blocks. Specifically, group plan operator 106, join plan operator 108, scan table and filter plan operator 112, and scan table plan operator 116 are the plan operators that make up execution plan 102. Branches between a parent plan operator and a child plan operator represent a flow of rows from the child plan operator to the parent plan operator. Thus, the output rows of a child plan operator are input rows to a parent plan operator. Plan operators are described herein as performing the operations that the plan operators themselves define. However, this is simply a convenient way of expressing that a database server is performing the operations defined by the plan operators when the database server executes the plan operators.

In execution plan 102, scan table and filter plan operator 112 and scan table plan operator 116 perform a scan of column col1 of table t1 and of column col2 of table t2, respectively. However, scan table and filter plan operator 112 additionally filters the scanned rows of table t1 so that only rows having col3=192 are selected and thereby included in the output of scan table and filter plan operator 112. Join plan operator 108 joins the rows that are output from scan table and filter plan operator 112 and scan table plan operator 116 to form the rows that are output by join plan operator 108. Group plan operator 106 groups the rows created by join plan operator 108 into groups. As a result of group plan operator 106, each row in the output represents a different group (in other words, each t1.col4 in the output is unique).

Functional Overview

In partial query caching, the results sets of individual plan operators of query are computed and stored in a storage area for potential reuse for other queries. The storage area is an operator output storage area, which will be referred to as output storage. The results sets of the plan operator are referred to herein as cached results sets. Each cached results set will have a signature generated based on the definition of the results set's respective plan operator. Plan operators with identical or similar definitions, and hence potentially identical or similar results sets, will have the same or similar signatures. To compute (i.e., generate results for) a plan operator, a signature is generated for the plan operator, and is used to search a storage area for a cached results set with the same signature. If a cached results set is found, the cached results set's plan operator may be further examined to determine whether the cached results set may be used as the results set for the plan operator being computed. In another embodiment, if a cached results set for a given signature is found, the plan operator is not further examined, and the cached results set is used as the results set of the plan operator. If a cached results set is not found, then the plan operator is executed. Additionally, the results set that was generated by executing the plan operator may be stored in the output storage for later use by another corresponding plan operator.

In an embodiment, first a search is performed for the entire query by searching for a results set of a plan operator that encompasses all of the plan operators of the execution plan of the query. If a results set was not stored for a plan operator corresponding to the entire query, then for one or more of the plan operators that make up the execution plan, the output storage is searched to see if cached results sets were stored for the corresponding plan operators.

In an embodiment, the plan operators are searched for, starting with those plan operators that encompass the largest portions of the search (e.g., a plan operator that encompasses the entire query), and proceeding to searching for the plan operators that encompass next largest portions of the search, which are encompassed within the plan operators of the largest portions of the query. In other words, if cached results set are not found for a parent plan operator, a search is performed for cached results sets for the plan operators that are the immediate children of the parent plan operator, if any exist.

Executing a Query

Figure 2:
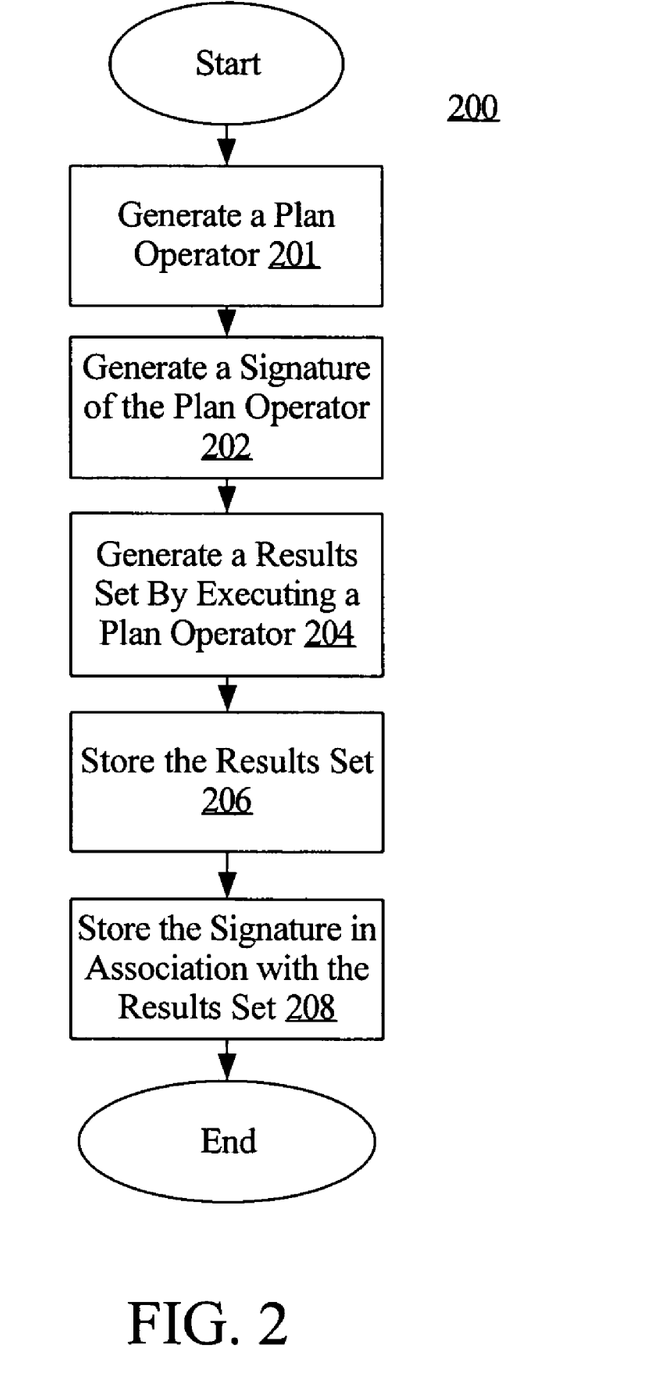
FIG. 2 is a flowchart showing a method of executing an plan operator, according to an embodiment of the invention.

FIG. 2 is a flowchart showing a method 200 of executing a plan operator, according to an embodiment of the invention. Method 200 shows steps performed when executing a plan operator. In step 201, a plan operator is generated for a query. In step 202, a signature of the plan operator is generated. In step 204, a results set is generated by executing the plan operator. In step 206, the results set, generated in step 204, is stored in the output storage (e.g., cached). The output storage is discussed further below. In step 208, the signature and optionally the plan operator are stored in a manner in which the signature and optionally the plan operator are associated with the cached results set.

Figure 3:
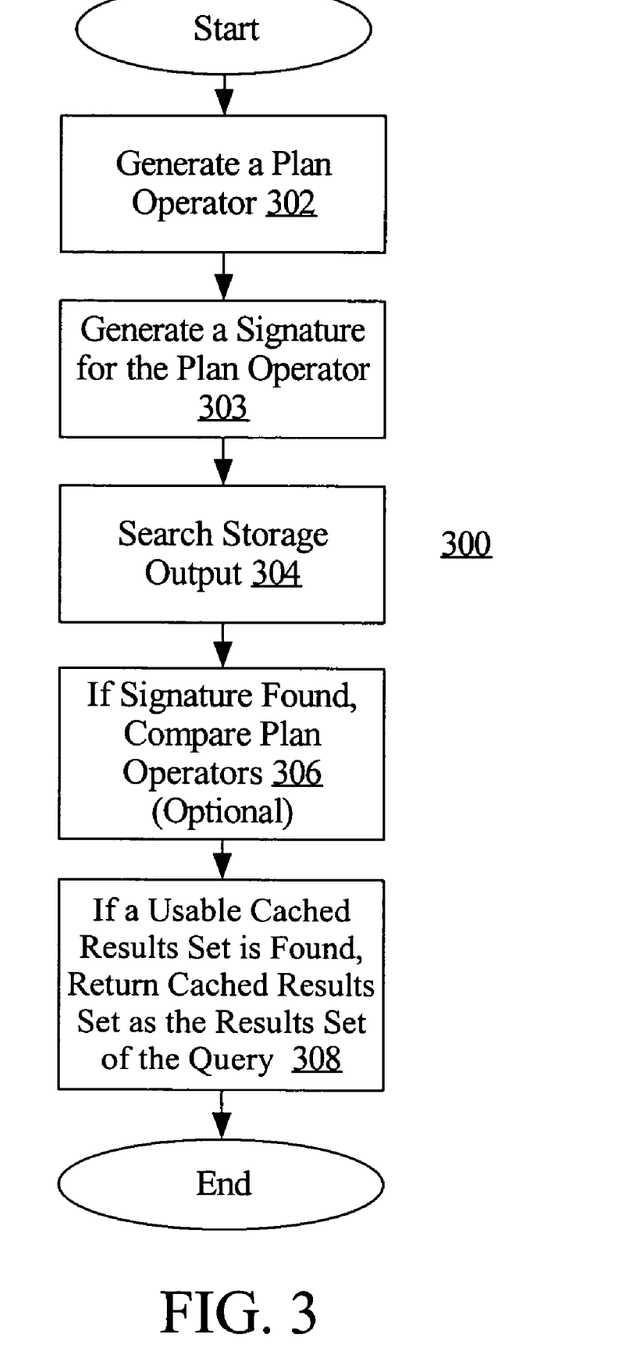
FIG. 3 is a flow chart showing a method of storing a results set, according to an embodiment of the invention.

FIG. 3 is a flow chart showing a method 300 of utilizing cached results sets, according to an embodiment of the invention. In step 302 a plan operator is generated for a query. In step 303, a signature is generated for plan operator that is being evaluated. In step 304, the output storage is searched for cached results set. In performing the search, a comparison may be performed between the signature of the plan operator that is being evaluated and the signatures stored in association with the cached results sets. In an embodiment, an exact match may not be required. In optional step 306, if a match is found, a further evaluation is performed in which the stored plan operator is compared to the plan operator being evaluated to see if the cached results set may be used. In step 308, if step 306 is included in the method 300, then if in step 306 it is determined that the cached results set is usable, the cached results set is returned (either to the user as a results set or for use as input by another plan operator) in lieu of executing the plan operator. In step 308, if step 306 is not included in method 300, then if in step 304 a match is found (e.g., if the two signatures are found to be sufficiently similar), the cached results set is returned in lieu of executing the plan operator.

Referring to FIG. 1, in carrying out method 300, upon receiving query 104, the database server formulates query plan 102. Then the database server checks the plan operator output storage area to see if cached results sets were stored for the plan operators that make up execution plan 102. Plan operators that constitute larger portions of the query are searched for first, because if results sets corresponding to the plan operators that make up the larger portions are found, there is no need to search for the plan operators that make up the smaller portions encompassed by the larger portions.

For example, in execution plan 102, first a search is done for a cached results set corresponding to group plan operator 106. If a results set is found, the results set found is returned to the user as the results set of query 104 rather than executing group plan operator 106 a second time. Additionally, there is no need to search for results sets for the remaining plan operators, because the remaining plan operators of execution plan 102 are encompassed within group plan operator 106.

However, if a cached results set corresponding to group plan operator 106 is not found, then the database server searches for a cached results set corresponding to join plan operator 108. If a cached results set is found that corresponds to join plan operator 108, then that cached results set is returned for use as input to group plan operator 106, and there is no need to execute the remaining operators of execution plan 102. After executing group plan operator 106 on the cached results set corresponding to join plan operator 108, the results set of group plan operator 106 (based on the cached results set corresponding to join plan operator 108) is returned to the user as the results set of query 104. The results set of executing group plan operator 106 may be stored in the output storage in case another query includes group plan operator 106 or a similar plan operator.

If a cached results set is not found that corresponds to join plan operator 108, then the database server searches for cached results sets corresponding to scan table and filter plan operator 112 and scan table plan operator 116. If a cached results set is found that corresponds to scan table and filter plan operator 112, the cached results set is returned for use by join plan operator 108. If a cached results set is not found for scan table and filter plan operator 112, then the database server executes scan table and filter plan operator 112 and returns the results set of executing scan table and filter plan operator 112 for use by join plan operator 108. Additionally, the results sets of scan table and filter plan operator 112 may be stored for later use. Similarly, if a cached results set are found for scan table plan operator 116, the cached results set is returned for use by join plan operator 108. If a cached results set is not found for scan table plan operator 116, then the database server executes scan table plan operator 116 and returns the results set of executing scan table plan operator 116 for use by join plan operator 108. Additionally, the results set of scan table plan operator 116 may be stored for later use. Join plan operator 108 is then executed on the results sets returned, whether the results sets returned originated from executing scan table and filter plan operator 112 and scan table plan operator 116, originated from finding the cached results sets corresponding to the scan table and filter plan operator 112 and scan table plan operator 116, or originated from finding cached results sets stored for one of, and performing the other of, scan table and filter plan operator 112 and scan table plan operator 116. Next group plan operator 106 is executed using the results set of join plan operator 108, and the results set of group plan operator 106 are returned to the user as the results set of query 104. As mentioned above, the results set of executing group plan operator 106 and/or join plan operator 108 may be stored in the plan operator output storage in case another query includes one of group plan operator 106 or join plan operator 108.

In an embodiment, the results set of a given operator may not necessarily be stored. Instead, a cost benefit analysis may be performed to determine whether to store the results set of the given operator or whether to not store the results set and have the operator executed a second time if another query includes the same operator. Some of the factors that may be used in determining whether to store the results set of the given operator are the time and resources necessary for executing the operator and the amount of storage area available. For example, if the time required to execute the plan operator is less than the expected time required to search the output storage for the cached results set, the results set may not be stored. Similarly, if the storage area required to store the results set is greater than the available storage area in the output storage (either because the results set is so large or because the storage area is full or nearly, for example), the results set may also not be stored. In contrast, if the results set does not require much storage area or there is a large amount of storage area available, and the plan operator requires a great deal of time to execute, the results set may be stored. Other factors that may be used in determining whether to store results set of a newly executed plan operator, as will be apparent to those skilled in the art.

Two different queries may each be formulated by a different set of database statements, but may nonetheless have the same execution plan. For example, a first query may include a NATURAL join, while a second query may be the same as the first query except instead of using a NATURAL join the join key is explicitly named in a USING clause. By formulating an execution plan and searching for results sets of the execution plan, the results sets of one query may be returned as the results sets of another query even though the two queries are formed by different sets of database statements.

The output storage may be any sort of memory, such as those described below in the HARDWARE OVERVIEW. In an embodiment, the output storage is one or more storage areas in one or more temporary or short term storage devices (e.g., volatile storage devices). In an embodiment, the short term output storage may have relatively fast access time (e.g., flash memory or RAM) when compared to long term memory (e.g., a hard drive). In an embodiment, the output storage is one or more storage areas in one or more long term storage devices (e.g., non-volatile storage devices). In an embodiment, the output storage is a combination of one or more storage areas in one or more long term storage devices and short term storage devices.

Signatures of Plan Operators

In an embodiment, a signature is established for each plan operator based on the plan operator's definition. The signatures are generated such that plan operators with the same or similar definitions have the same signature. In an embodiment, the signature may be based on a data structure used to define or describe a plan operator. For example, the data structure associated with the plan operator may be used to generate a hash value, which may be mapped to numerical values that are used for forming a sequence numbers used to compose a signature.

The results set of a plan operator may be stored with the signature of the plan operator. When a new query is received, the results sets associated with previously executed plan operators are searched for by searching for a results set that is associated with a plan operator having the same signature. Using signatures, two queries may be written differently, but their respective execution plans may share plan operators with the same signature.

Use of the signatures allows the database server to quickly find results sets that may be used for a query. In an embodiment, each plan operator is mapped to signature that represents an exact description of that plan operator. In an alternative embodiment, each plan operator is mapped to a signature that is also used for a set and/or range of other plan operators, and the results set associated with this signature is used for each of the plan operators within the set and/or range of the signature. In this embodiment, the signature does not necessarily represent an exact description of the plan operator. In an embodiment, after finding a match of signatures the plan operators are compared in order to evaluate whether the results set from one plan operator are expected to be usable as the results set of the other plan operator. In another embodiment, if the two signatures are match or are sufficiently close the cached results set found is used without a further check of the plan operator that produced the cached results set.

Plan Operators that are Similar but not Identical

Many times queries are similar but not identical. By searching for plan operators corresponding to queries that are not identical, the speed at which results sets may be returned for the query may be increased. Accordingly, in an embodiment, when searching for a results set of a plan operator, if a cached results set for a different plan operator is found that is similar, the results set of the similar operation may be used instead of executing the actual operation. For example, if a plan operator generated for a query involves finding a set of data associated with the dates Nov. 1, 2000-Jan. 1, 2004, and a cached results set is found for a plan operator that finds data associated with the dates Nov. 1, 2000-Feb. 23, 2004, the cached results set found may be used instead of executing the actual plan operator generated for the query. In one embodiment, the cached results set found is used "as is", without further modification. In another embodiment, the cached results set found is further filtered to remove some or all of the extra data in the cached results set. In another embodiment, the cached results set or the signature of the cached results set is evaluated to determine whether the user is likely to mind receiving the difference between the results requested and cached results set found, which in this example is the extra data associated with the dates Jan. 2, 2004 through Feb. 23, 2004. If it is expected that the user will not mind the difference, the cached results set found is returned rather than performing the plan operator. If it is expected that the user will mind the difference, the plan operator is executed or the cached results set is filtered to remove the extra data, Jan. 2, 2004 through Feb. 23, 2004.

In an embodiment, two plan operators may be considered similar if it is expected that a typical user is unlikely to care which results set is returned. For example, in an embodiment, if the content of a cached results set is expected to be nearly the same differing by only a small percentage of rows as that of plan operator's, then the cached result may be used as the results set of plan operator. Whether similar but different, or dissimilar, cached results sets may be used in this way may be controlled by user input. For example, a user may include a command or a parameter in a query that specifies whether similar, but different, cached results sets may be returned, or a variable in user's database session may be set to specify whether similar, but different, cached results sets may be returned, via an Application Programmer Interface ("API"). Parameters or variables may also specify the extent to which two plan operators or signatures may be different, while still allowing the cached results set of one to be used for the results set of the other.

Also, in an embodiment, if a first plan operator is expected to return all of a results set of a second plan operator in addition to some extra data, and the extra data is expected not to be so voluminous as to obscure the content corresponding to the results set of the second plan operator, then the results set of the first plan operator may be accepted as the results set of the second plan operator as is or after being modified. Similarly, in an embodiment, if a first plan operator is expected to return a smaller results set than a second plan operator, but the missing data is expected not to be important or a small amount, then the results set of the first plan operator may be accepted as the results set of the second plan operator as is or after being modified.

Stale Cached Results Sets

Even though plan operators for given queries may be identical, the results set for the plan operators may be different as a result of the queries being executed at different times. In an embodiment, when a cached results set corresponding to a given plan operator is found, a check is performed to see if the cached results set found is stale. For example, in an embodiment, the time a cached results set was computed is stored in association with cached results set in the plan operator output storage. If the age of a the cached results set is greater than a threshold age, the cached results set is no longer preserved in cache or used as the results set for the plan operator of another query. The threshold age may be based on user input as described above.

Hardware Overview

Figure 4:
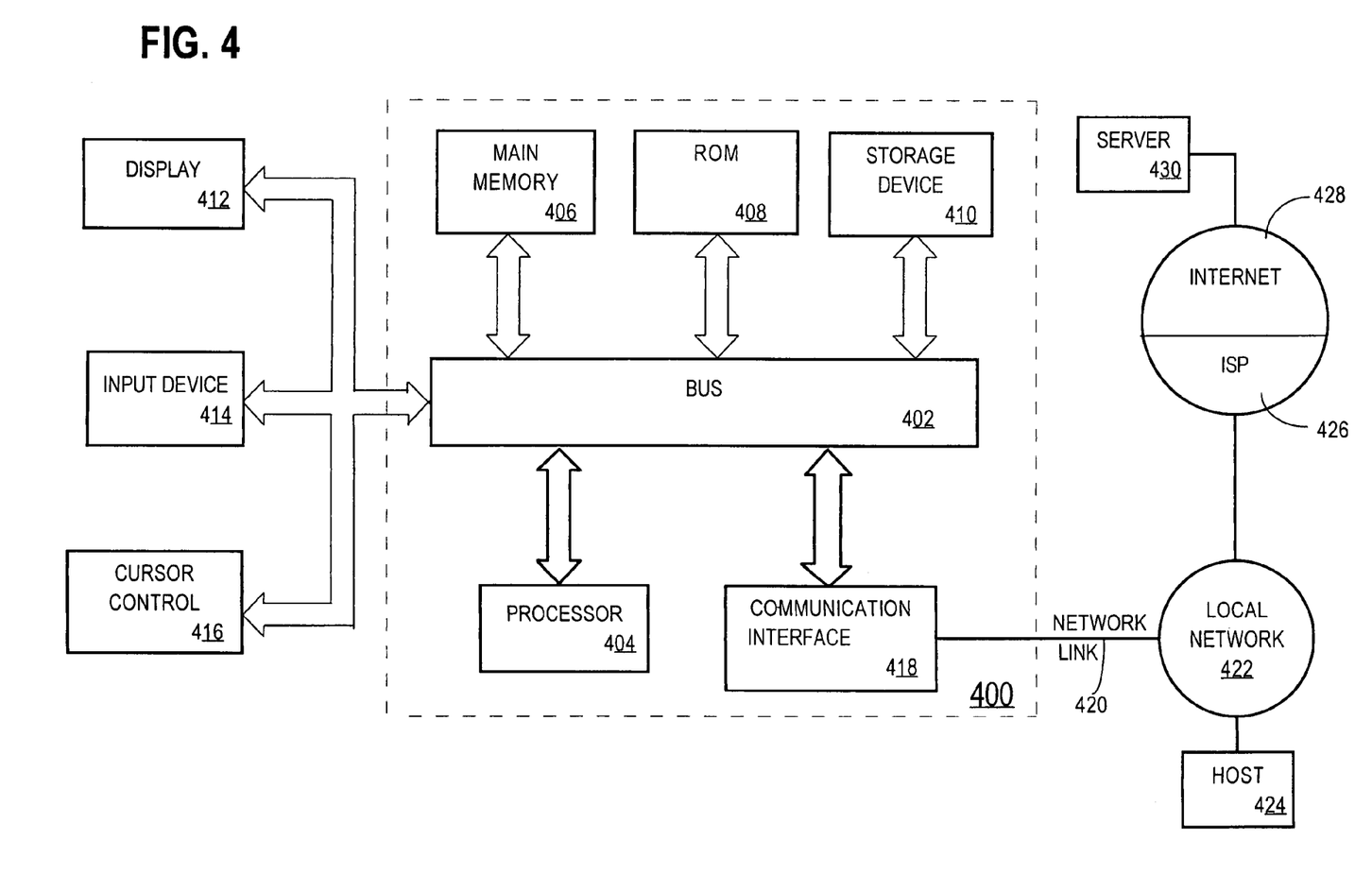
FIG. 4 is a block diagram that illustrates a computer system upon which an embodiment of the present invention may be implemented.

FIG. 4 is a block diagram that illustrates a computer system 400, is one example of a machine upon which an embodiment of the invention may be implemented. Specifically computer system 400 may be used as the database server and/or may be programmed to implement the partial query caching method described above. Computer system 400 includes a bus 402 or other communication mechanism for communicating information, and a processor 404 coupled with bus 402 for processing information. Computer system 400 also includes a main memory 406, such as a Random Access Memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a Read-Only Memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a Cathode Ray Tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may be used for storing results sets of plan operators. According to one embodiment of the invention, storage of results sets of plan operators and searching for cached results sets of previously executed plan operators in memory 112 is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein is one example of "machine-readable medium", and refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an Integrated Services Digital Network (ISDN) card or a modem to provide a data communication connection to a corresponding type of telephone line. As another example, communication interface 418 may be a Local Area Network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 420 might transmit a requested code for an application program through Internet 428, ISP 426, local network 422 and communication interface 418. In accordance with the invention, one such downloaded application provides for storage of results sets associated with previously executed plan operators in output storage, as described herein.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for computing a query at a database server comprising:

generating a plurality of first execution plans at the database server, wherein each first execution plan of said plurality of first execution plans is for executing a first query, wherein said each first execution plan includes a first plurality of plan operators, each plan operator of said first plurality of plan operators defining operations that are performed by the database server to execute said first query, execution of each plan operator of said first plurality of plan operators generating a first results set;

generating a plurality of first signatures by generating, for each plan operator of the first pluralities of plan operators of said plurality of first execution plans, a first signature;

generating a plurality of first results sets by executing each plan operator in said first pluralities of plan operators to generate a respective first results set for said each plan operator;

storing each first results set of said plurality of first results sets, wherein a first results set of a particular plan operator is stored in association with the respective first signature of said particular plan operator;

after storing the plurality of first results sets in association with said first signatures said database server receiving a second query from a user;

generating a second plan for executing the second query at the database server, wherein the second execution plan includes a second plurality of plan operators that include at least one second plan operator, each plan operator of said second plurality of plan operators defining operations that are performed by the database server to execute said second query;

generating a second signature for said at least one second plan operator of said second plurality of plan operators:

using said second signature, searching signatures of said plurality of first signatures to determine whether at least a subset of a particular first results set of said plurality of first results sets is usable as a second results set of said second operator; and upon determining that at least a subset of said particular first results set of said plurality of first results sets is usable as a second results set of said second operator, computing a second results set for the second query based on the subset of the particular first results set that was stored.

2. The method of claim 1, wherein the first signature of a particular plan operator is generated based on operations performed by said particular plan operator.

3. The method of claim 1, wherein the plan operator of said first pluralities of plan operators that is associated with said particular first results set, at least the subset of which is usable as said second results set, is identical to the second plan operator.

4. The method of claim 1, wherein the plan operator of said first pluralities of plan operators that is associated with said particular first results set, at least the subset of which is usable as said second results set, is not identical to the second plan operator.

5. The method of claim 1, wherein the plan operator of said first pluralities of plan operators that is associated with said particular first results set, at least the subset of which is usable as said second results set, is similar to the second plan operator.

6. The method of claim 1, wherein the plan operator of said first pluralities of plan operators that is associated with said particular first results set, at least the subset of which is usable as said second results set, is identical to the second plan operator, but the first results set and the second results set are different.

7. The method of claim 1, wherein a first execution plan of the plurality of first execution plans includes a third plan operator, the method further comprises: generating a third results set by executing the third plan operator, wherein the third results set is not stored.

8. The method of claim 1, wherein the step of determining includes at least determining when the first results set was computed.

9. The method of claim 1, wherein a difference exists between the plan operator of said the first pluralities of plan operators that is associated with said particular first results set, at the subset of which is usable as said second results set, and the second plan operator, and the step of computing includes at least modifying the first results set based on the difference.

10. A machine-readable storage medium storing one or more sequences of instructions, which when executed by one or more processors, causes the one or more processors to perform a method comprising the steps of:

generating a plurality of first execution plans at the database server, wherein each first execution plan of said plurality of first execution plans is for executing a first query, wherein said each first execution plan includes a first plurality of plan operators, each plan operator of said first plurality of plan operators defining operations that are performed by the database server to execute said first query, execution of each plan operator of said first plurality of plan operators generating a first results set;

generating a plurality of first signatures by generating, for each plan operator of the first pluralities of plan operators of said plurality of first execution plans, a first signature;

generating a plurality of first results sets by executing each plan operator in said first pluralities of plan operators to generate a respective first results set for said each plan operator;

storing each first results set of said plurality of first results sets, wherein a first results set of a particular plan operator is stored in association with the respective first signature of said particular plan operator;

after storing the plurality of first results sets in association with said first signatures, said database server receiving a second query from a user;

generating a second plan for executing the second query at the database server, wherein the second execution plan includes a second plurality of plan operators that include at least one second plan operator, each plan operator of said second plurality of plan operators defining operations that are performed by the database server to execute said second query;

generating a second signature for said at least one second plan operator of said second plurality of plan operators;

using said second signature, searching signatures of said plurality of first signatures to determine whether at least a subset of a particular first results set of said plurality of first results sets is usable as a second results set of said second operator; and upon determining that at least a subset of said particular first results set of said plurality of first results sets is usable as a second results set of said second operator, computing a second results set for the second query based on the subset of the particular first results set that was stored.

11. The machine-readable storage medium of claim 10, wherein the first signature of a particular plan operator is generated based on operations performed by said particular plan operator.

12. The machine-readable storage medium of claim 10, wherein the plan operator of said first pluralities of plan operators that is associated with said particular first results set, at least the subset of which is usable as said second results set, is identical to the second plan operator.

13. The machine-readable storage medium of claim 10, wherein the plan operator of said first pluralities of plan operators that is associated with said particular first results set, at least the subset of which is usable as said second results set, is not identical to the second plan operator.

14. The machine-readable storage medium of claim 10, wherein the plan operator of said first pluralities of plan operators that is associated with said particular first results set, at least the subset of which is usable as said second results set, is similar to the second plan operator.

15. The machine-readable storage medium of claim 10, wherein the plan operator of said first pluralities of plan operators that is associated with said particular first results set, at least the subset of which is usable as said second results set, is identical to the second plan operator, but the first results set and the second results set are different.

16. The machine-readable storage medium of claim 10, wherein a first execution plan of the plurality of first execution plans includes a third plan operator, and further comprises: generating a third results set by executing the third plan operator, wherein the third results set is not stored.

17. The machine-readable storage medium of claim 10, wherein the step of determining includes at least determining when the first results set was computed.

18. The machine-readable storage medium of claim 10, wherein a difference exists between the plan operator of said first pluralities of plan operators that is associated with said particular first results set, at least the subset of which is usable as said second results set, and the second plan operator, and the step of computing includes at least modifying the first results set based on the difference.

19. The method of claim 1, wherein receiving a second query from the user includes receiving the second query from a different user.

20. The machine-readable storage medium of claim 10, wherein receiving a second query from the user includes receiving the second query from a different user.

21. The method of claim 1, further comprising computing the subset of the first results set by applying a filter to the first results set that was stored, wherein the subset is generated based on a condition contained in the second query.

22. The machine-readable storage medium of claim 10, further comprising computing the subset of the first results set by applying a filter to the first results set that was stored, wherein the subset is generated based on a condition contained in the second query.

23. The method of claim 1, wherein determining further comprises searching for first signatures that correspond to plan operators that constitute larger portions of the query first.

24. The method of claim 8, further comprising determining whether the first results set is greater than a threshold age;
   upon determining that the first results set is greater than the threshold age, (a) removing the first results set from storage or (b) removing the first results set from consideration to use the first results set as part of the second results set.

25. The method of claim 1, wherein plan operators are at least one of: a group plan operator, a join plan operator, a filter plan operator, or a scan table plan operator.

26. The machine-readable storage medium of claim 10, wherein determining further comprises searching for first signatures that correspond to plan operators that constitute larger portions of the query first.

27. The machine-readable storage medium of claim 17, further comprising determining whether the first results set is greater than a threshold age;
   upon determining that the first results set is greater than the threshold age, (a) removing the first results set from storage or (b) removing the first results set from consideration to use the first results set as part of the second results set.

28. The machine-readable storage medium of claim 10, wherein plan operators are at least one of: a group plan operator, a join plan operator, a filter plan operator, or a scan table plan operator.

* * * * *

UNITED STATES PATENT AND TRADEMARK OFFICE
CERTIFICATE OF CORRECTION

| | | |
|---|---|---|
| PATENT NO. | : 7,676,453 B2 | Page 1 of 1 |
| APPLICATION NO. | : 10/830510 | |
| DATED | : March 9, 2010 | |
| INVENTOR(S) | : Cetin Ozbutun | |

It is certified that error appears in the above-identified patent and that said Letters Patent is hereby corrected as shown below:

In column 1, line 56, delete "an" and insert -- a --, therefor.

In column 10, line 46, in claim 1, delete "signatures" and insert -- signatures, --, therefor.

In column 10, line 56, in claim 1, delete "operators:" and insert -- operators; --, therefor.

In column 11, line 34, in claim 9, after "said" delete "the".

In column 11, line 36, in claim 9, delete "at" and insert -- at least --, therefor.

Signed and Sealed this

Twenty-first Day of September, 2010

David J. Kappos
*Director of the United States Patent and Trademark Office*